United States Patent
Pullumbi et al.

(10) Patent No.: US 7,618,477 B2
(45) Date of Patent: Nov. 17, 2009

(54) PLANE STRUCTURE FORMED FROM A MATRIX AND PHASE CHANGE MATERIAL USABLE FOR TREATING GASES

(75) Inventors: Pluton Pullumbi, Paris (FR); Vincent Gueret, Paris (FR); Maria-Eva Vidal-Prado, Rueil Malmaison (FR)

(73) Assignee: L'Air Liquide Societe Anonyme Pour l'Etude Et l'Exploitation des Procedes Georges Clauge, Paris (FR)

( * ) Notice: Subject to any disclaimer, the term of this patent is extended or adjusted under 35 U.S.C. 154(b) by 581 days.

(21) Appl. No.: 11/477,015

(22) Filed: Jun. 28, 2006

(65) Prior Publication Data

US 2007/0000384 A1 Jan. 4, 2007

(30) Foreign Application Priority Data

Jul. 4, 2005 (FR) .................................. 05 52030

(51) Int. Cl.
*B01D 53/02* (2006.01)

(52) U.S. Cl. ................ 95/96; 95/141; 96/130; 96/153

(58) Field of Classification Search ............. 95/96, 95/141, 153; 96/130
See application file for complete search history.

(56) References Cited

U.S. PATENT DOCUMENTS

| | | | |
|---|---|---|---|
| 4,971,605 | A | 11/1990 | Tarman |
| 5,861,050 | A | 1/1999 | Pittel et al. |

FOREIGN PATENT DOCUMENTS

| | | |
|---|---|---|
| EP | 0 344 014 | 11/1989 |
| EP | 1 536 128 | 6/2005 |
| FR | 2 847 586 | 5/2004 |

OTHER PUBLICATIONS

French Search Report for FR 0552030, Apr. 4, 2006.

*Primary Examiner*—Robert A Hopkins
(74) *Attorney, Agent, or Firm*—Young & Thompson

(57) ABSTRACT

The invention relates to an installation for separating or purifying gases comprising at least one gas treatment vessel, characterized in that the vessel comprises at least one plane structure comprising a matrix and at least one phase change material (PCM).

17 Claims, 3 Drawing Sheets

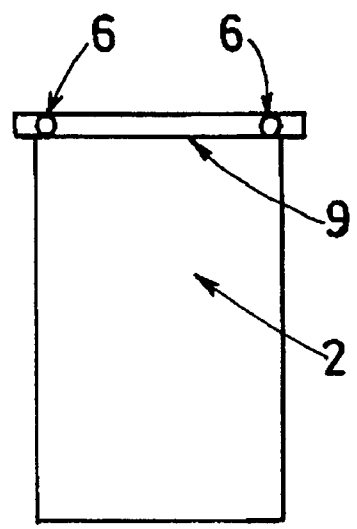
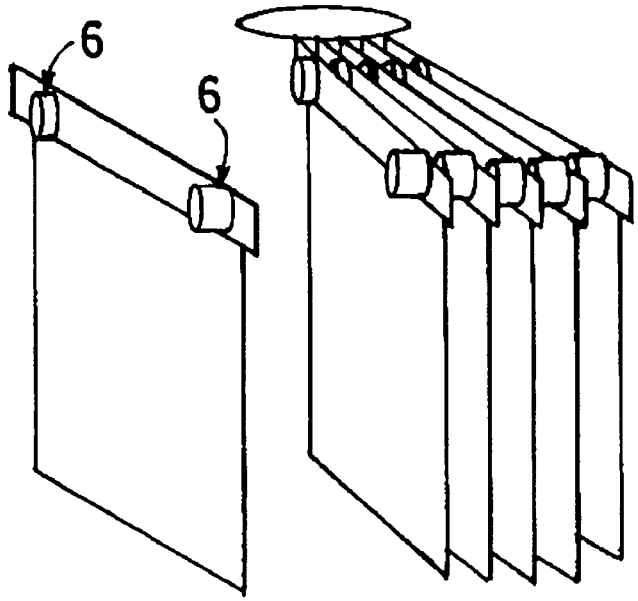
FIG.2a  FIG.2b  FIG.2c
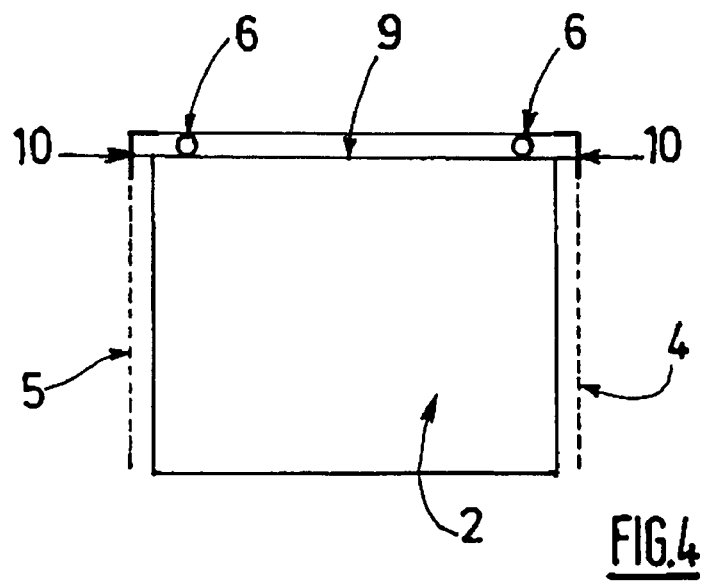
FIG.4

PLANE STRUCTURE FORMED FROM A MATRIX AND PHASE CHANGE MATERIAL USABLE FOR TREATING GASES

This application claims the benefit of priority under 35 U.S.C. § 119 (a) and (b) to French Application No. 0552030, filed Jul. 4, 2005, the entire contents of which are incorporated herein by reference.

BACKGROUND

The invention relates to an installation for separating or purifying gases, in particular a PSA, TSA or VSA unit, comprising at least one plane structure formed from a matrix supporting one or more phase change materials (PCM) and its use for gas separation or purification.

PSA or VSA units are suitable for separating gases by pressure cycling of the gas to be treated through an adsorbent bed (zeolite, activated carbon, etc.).

Adsorption is an exothermic mechanism. In fact, the thermal effects resulting from the enthalpy of adsorption have two consequences on the temperature in the bed, that is a stabilization, in steady state conditions, of an average temperature profile, with a cold point at the inlet; and a propagation, for each cycle, of an adsorption heat wave limiting the adsorption and a desorption cold wave limiting the desorption.

In present day separation units, the average temperature profile is optimized. The limiting thermal effect is the local cycling of temperature fluctuations, as recalled by document EP 1 888 470.

One solution consists in adding a phase change material (PCM) to the bed. In this way, at least part of the heat of adsorption and of desorption is absorbed by the PCM in the form of latent heat. However, the sprinkling of PCM powder on the agglomerated beads raises mixing problems, as stated by document U.S. Pat. No. 4,971,605.

Moreover, in this case, the material is subjected to the gas stream and may therefore gradually leave the system.

As regards this limitation, encapsulation of the PCM in microspheres of about a few microns in diameter offers the possibility of a shaping in a support matrix.

One problem that nevertheless arises is the shape of this matrix and its uniform incorporation in an adsorbent, catalyst or similar bed, which can be used in a PSA, TSA, VSA type of installation, a catalytic reactor or similar.

One solution of the invention is accordingly an installation for separating or purifying gases comprising at least one gas treatment vessel, characterized in that the said vessel comprises at least one plane structure comprising a matrix and at least one phase change material (PCM).

Depending on each case, the installation of the invention may comprise one or more of the following features:
 the plane structure has a sheet or plate shape, preferably rigid,
 the plane structure is formed essentially of one or more PCM,
 the plane structure has a thickness of between 0.1 mm and 40 mm,
 the matrix is made from fabric, metal or polymer,
 the PCM(s) is(are) deposited, retained or impregnated on the matrix,
 the said at least one gas treatment vessel comprises a plurality of plane structures,
 the vessel is an adsorber or a catalytic reactor comprising a plurality of plane structures spaced from one another by inter-spaces, each inter-space comprising at least one adsorbent material or at least one catalyst material, preferably an adsorbent or catalyst material in the form of particles,
 the adsorber or the reactor has a cylindrical or conical shape and the said plane structures are arranged radially in the adsorber or the reactor, preferably the adsorber comprises a central axial passage,
 the said structures are arranged in one or more modules, the said modules being arranged in at least one adsorber or at least one catalytic reactor.

The invention also relates to a method for separating or purifying gases, in which:
 a) a gas to be treated is introduced into an installation according to the invention; and
 b) a gas product is recovered at the outlet of the said installation.

Preferably, a PSA, VSA or TSA type of adsorption process is used.

The gas to be treated is air, an $H_2/CO$ mixture, a synthesis gas, or a waste combustion gas.

The gas product is a gas selected from $N_2$, $O_2$, $H_2$, $CO_2$, argon and Co.

BRIEF DESCRIPTION OF THE DRAWINGS

FIGS. 2a, 2b, and 2c show panels uniformly spaced with inserts.

FIG. 4 shows a single panel of the invention, the panel including a rule equipped with hooks.

DETAILED DESCRIPTION OF THE INVENTION

The invention will now be described in greater detail with reference to the illustrative figures appended hereto.

Figure 1:
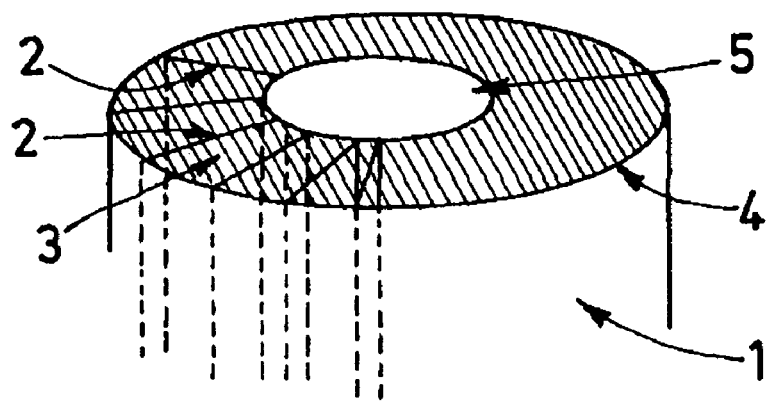
FIG. 1 shows an adsorber with a geometry called radial, with a plurality of panels incorporating microcapsules of PCM.

FIG. 1 schematically shows an implementation, in an adsorber 1 with a geometry called "radial", of an installation according to the invention, with a plurality of panels 2 incorporating microcapsules of PCM.

In the "radial" adsorber containing the adsorbent particles, these panels 2 are arranged vertically and radially, and are spaced so that they are uniformly distributed in a section of the bed of particles, particularly of beads, of adsorbent 3.

The fabrication of a radial adsorber 1 of an installation according to the invention consists in arranging two concentric and gas-permeable shells 4, 5 and in arranging panels 2 of fabric containing PCM between the two shells 4, 5.

As shown in FIGS. 2a to 2c, these panels 2 are uniformly spaced using inserts 6. Once all the panels 2 are installed, the adsorbent 3 is poured between the two shells 4, 5 into the spaces arranged between the panels 2. To optimize the filling, the adsorber 1 may be subjected to vibrations during the operation.

This practice serves to obtain modular 7 adsorbers 2. Each assembly or module 7 consisting of two shells 4, 5, of panels 2 and of the adsorbent 3 constitutes a slice of the final bed. These assemblies are then stacked in order to obtain the height of the final bed (FIG. 3).

Figure 3:
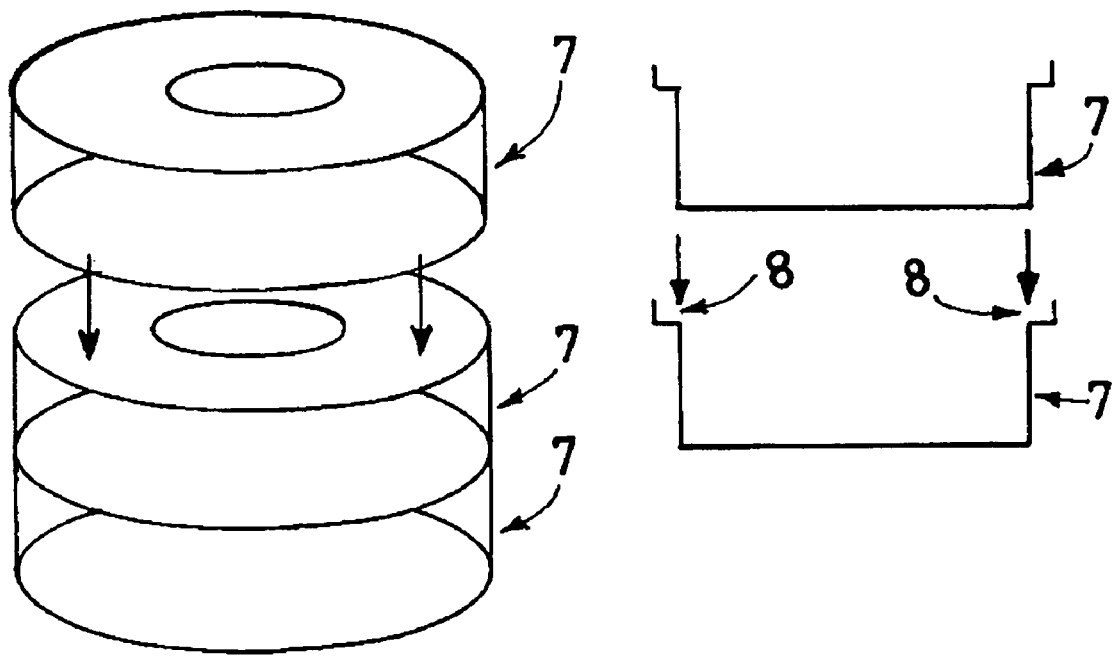
FIG. 3 shows two modules, and a zone for fitting two successive modules into one another.

To avoid bypasses between two modules 7, a zone 8 for fitting two successive modules 7 into one another is provided (FIG. 3).

The invention, consisting in inserting panels 2 containing PCM into an adsorbent bed, is also applicable to axial beds.

The panels in an installation according to the invention are made from fabric, from metal, or from polymer. The metal panels can be fabricated by impregnating them with a coat of varnish or paint containing PCM microcapsules in its formulation. The polymer or fabric panels can be fabricated either by impregnation, or by direct molding of the molten material containing PCM microcapsules in its formulation. The polymer or fabric panels may be encased in two metal sheets on either side, in order to prevent direct contact between the PCM and the process gas.

Finally, the thickness and the microporous structure (porosity, tortuosity) of the panels are optimized in order to obtain material diffusion kinetics in the adsorbent materials in these panels.

The total volume occupied by the panels containing the PCM represents between 5 and 20% of the total volume of the adsorber (screens+panels).

To ensure good contact between these panels and the adsorbent, it is preferable for the inter-space between two successive panels to be between 1 mm and 20 mm on the inner shell side, preferably between 2 mm and 10 mm. To guarantee this spacing and to ensure the maintenance of the sheets, each panel has a rule 9 along one of its edges, of plastic or of metal, provided with stops 6 (FIG. 2).

The thickness difference of the stops 6 allows the cylindrical arrangement of the panels around the inner shell (FIG. 2). The stops 6 may be mounted on a single side or on both sides of the rule 9. There should be several stops 6 of increasing thickness along the rule 9. The rule 9 is thin enough to avoid hindering the filling of the adsorbent. Finally, it is also possible to frame the panel with four rules, like a slide.

Several technical solutions are available for maintaining the panels containing the PCM between the two shells.

According to a first embodiment, each rule 9 is equipped with hooks 10 at its two ends for hooking to the two shells as shown in FIG. 4.

Figure 5:
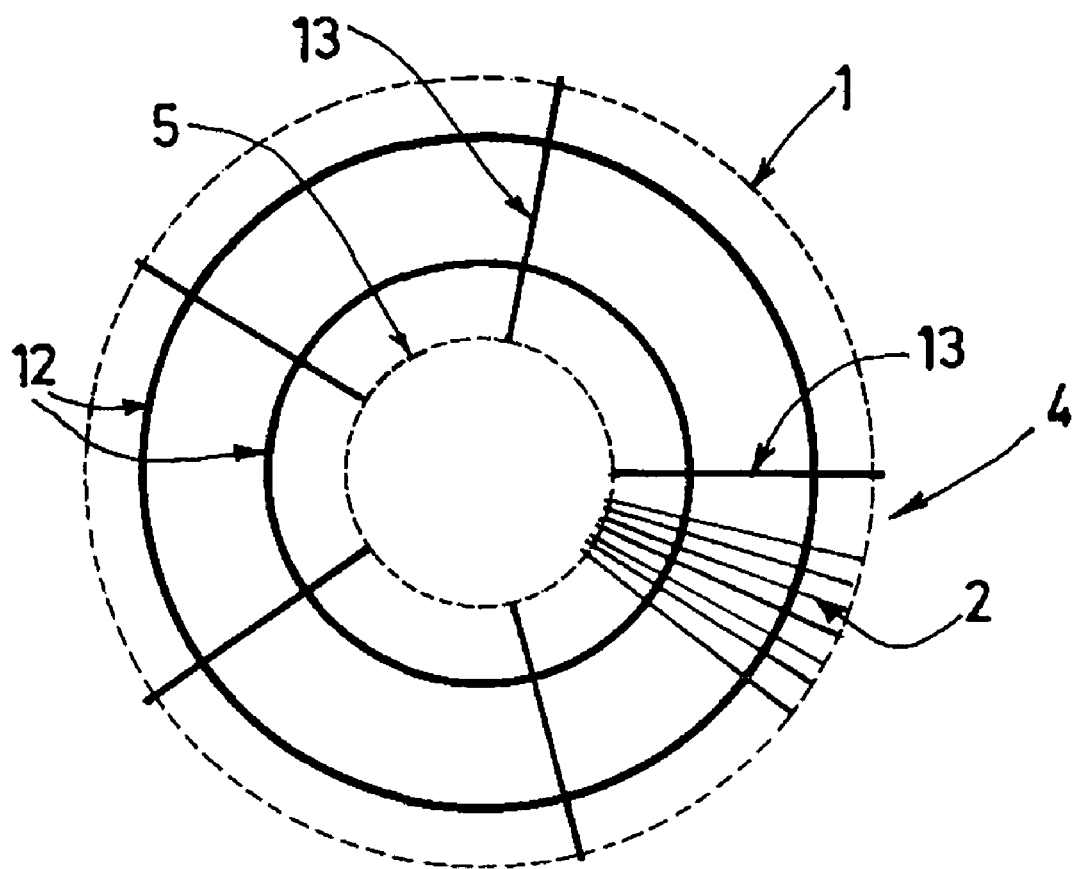
FIG. 5 shows a panel with holes drilled in the top of the panel and the panel threaded on rails.
Figure 5:
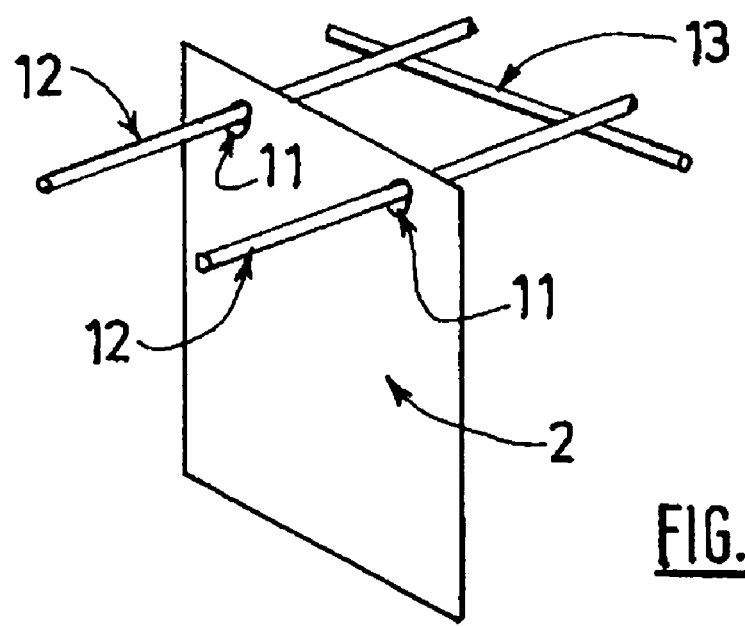

According to another embodiment, holes are drilled in the top of the panel 2 and the panels are threaded on rails 12. Support or reinforcing rods 13 between the shells serve as a rest for these rails 12, as shown in FIG. 5.

The end and the cover of each ring of screens according to the invention consist of a fine grille, for example metal or plastic.

An installation with panels containing PCM according to the invention is suitable for implementing a VSA, PSA or TSA type of process for gas separation or purification, in order to produce one or more compounds among $O_2$, $H_2$, $CO_2$, Ar, $N_2$, etc., from air, from an $H_2/CO$ mixture, from a syngas or synthesis gas, from a waste combustion gas for example, by selective adsorption of $N_2$, $O_2$, CO, $CO_2$, $H_2O$, of saturated or unsaturated hydrocarbons, of sulphur compounds or nitrogen oxides.

Many chemical processes, apart from the VSA, TSA or PSA process, have the same limitations due to heat transfer considerations. These other processes are, for example, heterogeneous catalysis in general or the filling of gas for storage.

It follows that the invention can therefore advantageously be applied to the field of heterogeneous catalysis. The heterogeneous catalysis reaction takes place on the catalyst surface, via its surface atoms. It is generally broken down into five steps, that is: diffusion of the reagents to the surface, adsorption of the reagents, the chemical reaction on the solid surface, the desorption of the products and the diffusion of the products outside the surface.

Control of the temperature in a catalytic reactor would serve to optimize these steps and to propose new processes. For example, the synthesis of methyl chloride by methane oxyhydrochlorination as one method for synthesizing methanol would be economically advantageous if an isothermal reactor is used.

Another potential application of this technology is the storage of various gases such as methane and hydrogen.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. An installation for separating or purifying gases comprising at least one gas treatment vessel, wherein said vessel comprises at least one plane structure comprising a matrix and at least one phase change material (PCM).

2. The installation of claim 1, wherein the at least one plane structure has a sheet or plate shape.

3. The installation of claim 1, wherein the at least one plane structure is formed essentially of one or more PCM.

4. The installation of claim 1, wherein the at least one plane structure has a thickness of between 0.1 mm and 40 mm.

5. The installation of claim 1, wherein the matrix is made from fabric, metal or polymer.

6. The installation of claim 1, wherein the at least one PCM is deposited, retained or impregnated on the matrix.

7. The installation of claim 1, wherein the at least one plane structure comprises a plurality of plane structures.

8. The installation of claim 1, wherein said vessel is an adsorber or a catalytic reactor, comprising:
   a plurality of structures spaced from one another by inter-spaces, each inter-space comprising at least one adsorbent material or at least one catalyst material.

9. The installation of claim 1, wherein the adsorber or the reactor has a cylindrical or conical shape, and
   said plane structures are arranged radially in the adsorber or the reactor.

10. The installation of claim 1, wherein said structures are arranged in one or more modules, said modules being arranged in at least one adsorber or at least one catalytic reactor.

11. A method for separating or purifying gases, in which: a) a gas to be treated is introduced into an installation of claim 1; and b) a gas product is recovered at the outlet of said installation.

12. The method of claim 11, wherein the gas to be treated is air, an $H_2/CO$ mixture, a synthesis gas, or a waste combustion gas.

13. The method of claim 12, wherein the gas product is a gas selected from $N_2$, $O_2$, $H_2$, $CO_2$, argon and CO.

14. The method of claim 11, wherein the method for separating or purifying gases is of a PSA, VSA or TSA type of process for gas separation or purification.

15. The installation of claim 2, wherein the at least one plane structure is rigid.

16. The installation of claim 8, wherein the at least one adsorbent material or at least one catalyst material is in the form of particles.

17. The installation of claim 9, the adsorber comprises a central axial passage.

* * * * *

UNITED STATES PATENT AND TRADEMARK OFFICE
CERTIFICATE OF CORRECTION

PATENT NO.        : 7,618,477 B2  Page 1 of 1
APPLICATION NO. : 11/477015
DATED             : November 17, 2009
INVENTOR(S)       : Pullumbi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 723 days.

Signed and Sealed this

Fourteenth Day of December, 2010

David J. Kappos
*Director of the United States Patent and Trademark Office*